United States Patent [19]
Haddad, Jr.

[11] Patent Number: 5,340,187
[45] Date of Patent: Aug. 23, 1994

[54] FRONT MOUNT TELESCOPIC ARM TRUCK COVER SYSTEM

[75] Inventor: Edward N. Haddad, Jr., Worcester, Mass.

[73] Assignee: Pioneer Consolidated Corporation, North Oxford, Mass.

[21] Appl. No.: 16,169

[22] Filed: Feb. 10, 1993

Related U.S. Application Data

[63] Continuation-in-part of Ser. No. 931,030, Aug. 14, 1992, Pat. No. 5,238,287.

[51] Int. Cl.⁵ .................................................. B60P 7/04
[52] U.S. Cl. ......................................... 296/98; 160/71
[58] Field of Search .......................... 296/98, 100, 101; 242/86.52; 160/67, 68, 69, 71, 72, 80; 105/377

[56] References Cited

U.S. PATENT DOCUMENTS

| | | | |
|---|---|---|---|
| 3,041,104 | 6/1962 | Richard | 296/100 |
| 3,366,414 | 1/1968 | Thompson et al. | 296/100 |
| 3,549,199 | 12/1970 | Sibley | 296/100 |
| 3,628,826 | 12/1971 | Sibley | 296/98 |
| 3,868,142 | 2/1975 | Bachand et al. | 296/98 |
| 3,964,781 | 6/1976 | Fenton | 296/100 |
| 3,975,047 | 8/1976 | McClellan | 296/100 |
| 4,023,857 | 5/1977 | Killion | 296/98 |
| 4,030,780 | 6/1977 | Petretti | 296/100 |
| 4,050,734 | 9/1977 | Richard | 296/98 |
| 4,095,840 | 6/1978 | Woodard | 296/100 |
| 4,157,202 | 6/1979 | Bachand | 296/100 |
| 4,189,178 | 2/1980 | Cramaro | 296/105 |
| 4,341,416 | 7/1982 | Richard | 296/98 |
| 4,516,802 | 5/1985 | Compton | 296/98 |
| 4,518,194 | 5/1985 | Kirkham et al. | 296/100 |
| 4,874,196 | 10/1989 | Goldstein et al. | 296/98 |
| 4,981,317 | 1/1991 | Acosta | 296/98 |

FOREIGN PATENT DOCUMENTS 560822  4/1975  Switzerland ................. 160/71

*Primary Examiner*—Dennis H. Pedder
*Attorney, Agent, or Firm*—Weingarten, Schurgin, Gagnebin & Hayes

[57] ABSTRACT

A trick cover assembly is provided having an improved telescopic arm assembly for drawing a flexible cover across an upwardly open truck body or container. In one embodiment, the front mounted assembly is secured to a portion of the truck frame between the cab and the body, and comprises a pair of pivoting telescopic arms, a drive motor, a flexible truck cover, a tie-rod, and a cover housing. As the drive motor moves the arms fore or aft, arm mounted actuators cause the segmented arms to extend or retract so that the tie-rod connecting the upper arm ends and securing one end of the cover, travels horizontally over the upper edge of the body in close proximity to it. Extension or retraction of the telescopic arms occurs simultaneously and proportionately with the rearward or forward pivoting of the arms. The cover housing, optionally mounted on a retractable gantry, protects the cover and incorporates a spring tension device to assist in smoothly rolling and unrolling the flexible cover. In another embodiment, a pair of telescopic arms are rotatable to a position parallel the upper edge of the container and are extended therealong to unroll or retract the cover.

12 Claims, 5 Drawing Sheets

FRONT MOUNT TELESCOPIC ARM TRUCK COVER SYSTEM

RELATED APPLICATION

This application is a continuation-in-part of Ser. No. 07/911,030 filed Aug. 14, 1992, entitled FRONT MOUNT TELESCOPIC ARM TRUCK COVER SYSTEM, now U.S. Pat. No. 5,238,287.

FIELD OF THE INVENTION

The invention relates to truck covers and more particularly to an assembly used to manipulate a truck cover.

BACKGROUND OF THE INVENTION

Pliable covers for truck bodies, containers, or trailers serve both to protect a load within the body and to minimize the likelihood of all or part of the load from escaping from the body. Because covers for truck bodies are often large and unwieldy, some form of mechanical assistance is useful to spread and secure the cover over the truck body. Truck cover manipulators provide this assistance.

A truck cover manipulator assembly, such as shown in U.S. Pat. No. 4,050,734 to Richard, uses two metal arms powered by a drive mechanism to draw the flexible cover over the body from one end to the other. As the arms move longitudinally, the arm ends securing one end of the cover move in an arcuate path. When the arms are vertical, they raise the effective height of the truck considerably. Even when an operator is aware that the arms will extend upward, their exact height and amount of obstacle clearance are difficult to estimate visually. This situation is particularly hazardous when a truck cover manipulator assembly is operated near overhead power lines, because the arms of the truck cover manipulator assembly have the potential to contact the power lines and electrocute the operator or damage the truck.

In addition to the risk of electrocution, as the arms swing up and over the body, the upper portion of the arms are susceptible to bending from the load upon them or from striking an object. Furthermore, as the truck cover rises up with the arms, the truck cover may be caught by the wind, thereby inhibiting proper operation of the system or causing damage to it. In certain confined areas, such as in tunnels or under bridges, it is not possible to operate this type of manipulator assembly at all.

One solution for problems associated with truck cover support arms raising high above the body is taught in U.S. Pat. No. 4,874,196 to Goldstein et al. Goldstein teaches attachment of pivoting telescopic arms and actuators near the midpoint of a container for drawing a cover across the container in a low trajectory. Other truck cover manipulators such as U.S. Pat. Nos. 3,964,781 to Fenton; 4,023,857 to Killion; and 3,041,104 to Richard teach substantially horizontal deployment and retraction of a cover over an open body using tracks, guide-rails, or cables integrated with the body to help guide and anchor the cover.

Because the prior art truck cover assemblies are permanently attached to their bodies, their use is not economical in a trucking operation which uses roll-off container bodies, nor do they offer the possibility of an easily installed and detached manipulator comprising a single self-contained assembly. Additionally, arms mounted at the midpoint of a body, whether projecting outward from the body or not, are not well protected from being struck and are therefore easily damaged. Furthermore, some laws or regulations do not allow truck covers or their manipulation assemblies to extend laterally beyond the maximum allowable legal container width.

SUMMARY OF THE INVENTION

A self-contained, easily installed and removed, front mounted truck cover assembly uses telescopic arms for drawing a flexible cover horizontally across an upwardly open truck body or container at substantially the same height as the upper edge of the body. The entire assembly is mounted on a portion of the truck frame between the cab and body, and permits unobstructed access to the interior of the body. Because the assembly is independent from the body, it is especially usefully for roll-off container bodies. In one embodiment, the assembly comprises a flexible cover, a cover housing, a support structure, a pair of pivoting telescopic arms, and a drive motor. As the drive motor moves the arms fore or aft, a separate drive mechanism causes the arms to simultaneously extend or retract so that the upper arm ends securing one end of the cover travels parallel and in close proximity to the upper edge of the body. The cover housing protects the cover and incorporates a winding device to assist in smoothly rolling and unrolling the flexible cover.

In another embodiment, the assembly further comprises a cover housing mounted on a retractable gantry. When the gantry is fully retracted, the cover housing is below the upper edge of the body. The gantry is raised to an appropriate height for extraction and rewinding of the cover. The telescopic arms are fully retractable below the upper edge of the body, and may be connected by a tie-rod.

In yet another embodiment, telescopic arms are connected to a telescopic gantry, neither the gantry nor the spacing between the telescopic arms being wider than a maximum legal width container body. The gantry includes a rotation actuator to rotate the arms through at least the horizontal to an out-of-the-way position, after which the container body is placed onto the truck. The telescopic arms having a flexible cover attached thereto are then extended along the upper edge of the container body to unfurl the cover from a retracted position to cover a load.

DESCRIPTION OF DRAWINGS

The invention will be more fully understood from the following detailed description, taken in conjunction with the accompanying drawings in which.

DETAILED DESCRIPTION OF THE INVENTION

Figure 1:
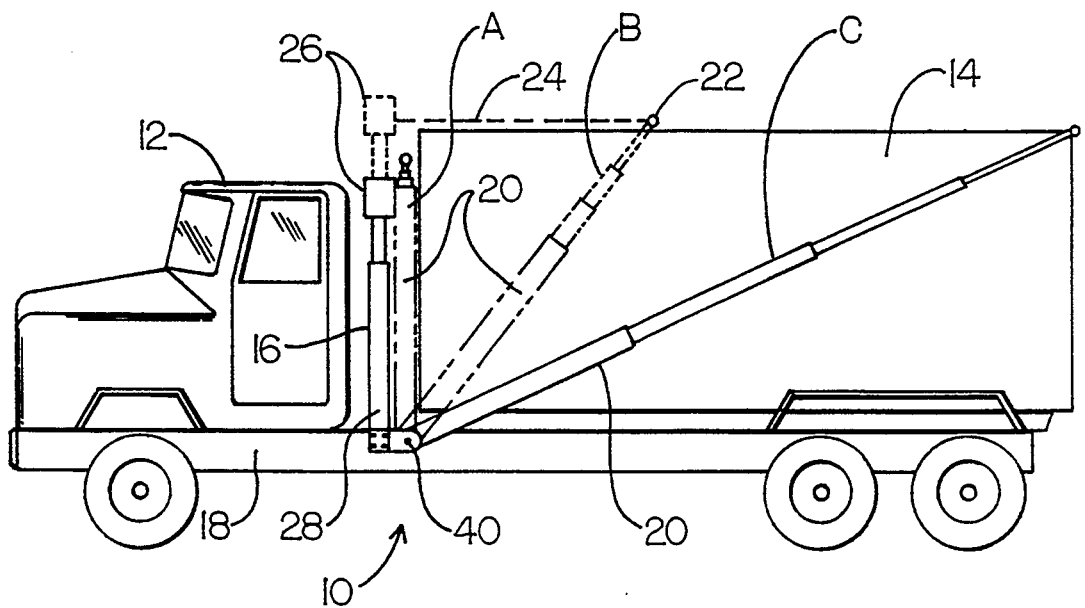
FIG. 1 is a side view of a front mount telescopic arm assembly installed on a container truck with a roll-off container body.

FIG. 1 depicts a left side view of a container truck 10, having a cab 12 and an upwardly open roll-off container 14, with an embodiment of a front mount telescopic arm assembly 16 installed thereon. The assembly 16 is a single unit with several components and is located behind the cab 12 and mounted to a portion of the frame 18 of the truck 10 in front of, and independent from, the container 14. Thus, when the body 14 is rolled off of, or separated from the frame 18 of the truck 10, the assembly 16 remains behind and is available for use with a subsequently installed container 14.

Another benefit of positioning the assembly 16 between the cab 12 and container 14 is a reduced exposure to damaging impacts or scrapes. The assembly 16 is dimensioned so that it protrudes minimally from the sides of the of the truck 10 if at all. Additionally, the nature and location of the assembly 16 permit unobstructed loading and unloading of a container 14 as well as unobstructed access to the interior of the container. Furthermore, incorporation of all components of the assembly 16 into a single unit, allows for it to be rapidly and easily installed and removed as needed.

The assembly 16 shown in FIG. 1 has two substantially identical telescopic arms 20 pivotally attached at their base to the assembly 16, one telescopic arm 20 on the right side of the truck 10 and the other telescopic arm 20 on the left side. A tie-rod 22 connects the upper ends of the telescopic arms 20 to each other and anchors one end of a flexible truck cover 24. By connecting the upper ends of the telescopic arms 20, the tie-rod 22 stabilizes the telescopic arms 20 during movement of the truck 10 and it helps to ensure that the telescopic arms 20 move in unison when activated. The tie-rod 22 is typically a bar or tube with curved exterior surfaces that glide smoothly over the upper surfaces of the container 14 if they are in contact- A cover housing 26 anchors the other end of the truck cover 24 and is mounted on a telescopic gantry 28. The cover housing 26 provides a means for easily furling and unfurling the truck cover 24 when the assembly 16 is activated and shields the truck cover 24 from wind blast when the truck 10 is driven at highway speeds.

When the assembly is activated, the telescopic arms 20 simultaneously pivot while telescoping. FIG. 1 depicts the telescopic arms 20 in three different positions corresponding to various stages of activation of the assembly 16. A first, or fully retracted stage (A), is when each of the telescopic arms 20 are completely compressed and in an upright position in front of the container 14, the telescopic gantry 28 is lowered, and the truck cover 24 is stowed in the cover housing 26. In this retracted stage, the interior of the upwardly open container 14 is completely unobstructed by any element of the assembly 16 which might either interfere with or be damaged by loading or unloading operations.

An intermediate stage (B) is obtained when the fully retracted assembly 16 is activated in order to cover the container 14, or when the fully extended assembly 16 is retracted to uncover the container 14. In either instance, the telescopic gantry 28 is raised a sufficient amount to permit smooth and unobstructed unfurling of the truck cover 24, and each of the telescopic arms 20 are raised enough to allow the tie-rod 22 to pass over the container 14. Simultaneous extension of the telescopic arms 20 places the truck cover 24 under tension, thereby causing the truck cover 24 to be unfurled from the cover housing 26 and pulled over the container 14. In like manner, simultaneous contraction of the telescopic arms 20 reduces tension on the truck cover 24, thereby allowing a rewinding mechanism as known in the art to retract and stow the truck cover 24 within the cover housing 26.

A fully extended position (C) is obtained when the telescopic arms 20 are elongated to a length sufficient to reach a desired end point on the container 14. The truck cover 24 is spread over substantially all of the upwardly open portion of the container 14 and held securely in place over the load by tension created by the mechanism in the cover housing 26 as well as by the telescopic arms 20. The telescopic arms 20 are held in position by mechanical, electrical, pneumatic or hydraulic force.

Figure 2:
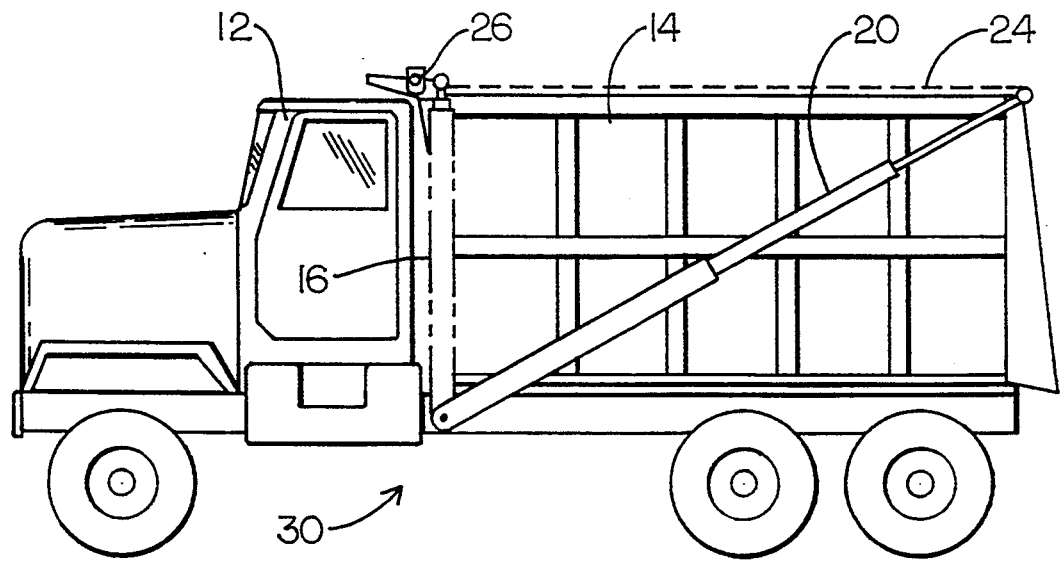
FIG. 2 is a side view of a front mount telescopic arm assembly installed on a truck with a dump body.

Referring to FIG. 2, a different embodiment of the front mount telescopic arm assembly 16 is shown for use with a dump-body truck 30. In this embodiment the telescopic arms 20 are as described with respect to FIG. 1, however, the cover housing 26 is affixed to a portion of the container 14 in lieu of the telescopic gantry 28 of FIG. 1. Operation of the assembly 16 is substantially similar to that described with respect to FIG. 1.

Figure 3:
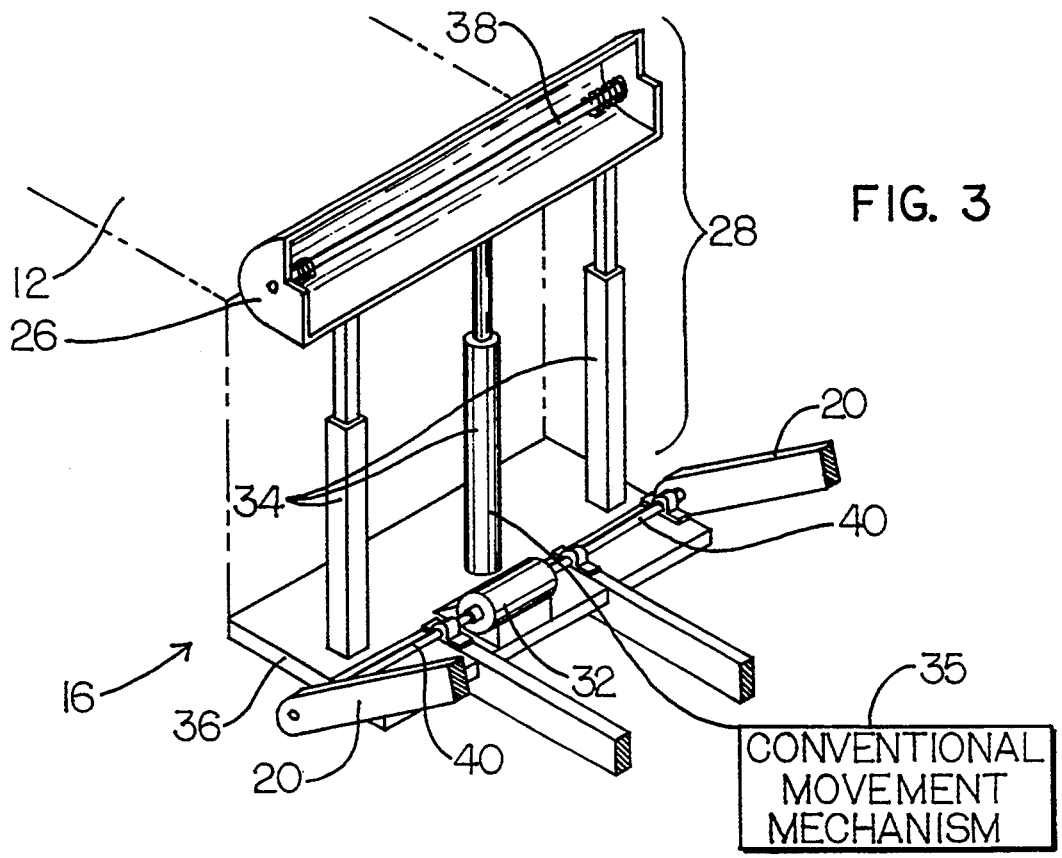
FIG. 3 is a perspective view of the front mount telescopic arm assembly of FIG. 1.

FIG. 3 is a perspective view of one embodiment of the assembly 16 of FIG. 1, showing additional features of the telescopic gantry 28 and a drive mechanism 32 for moving the telescopic arms 20 fore and aft. The telescopic gantry 28 consists of at least one telescopic support pillar 34 secured to a support platform 36. The support platform 36 is used to support the components of the assembly 16 and provides a single point of connection for securing the entire assembly 16 to the frame 18 of the truck 10 to facilitate installation and removal of the assembly. The assembly 16 is also suitable for being permanently affixed to the frame 18 of the truck 10, and additional support elements may be used to further strengthen its attachment thereto.

In FIG. 3, the cover housing 26 is supported by three telescopic support pillars 34 with the central pillar 34 incorporating a device for providing a controlled force to raise, lower, and lock the cover housing 26 in various positions. However, any or all of the three pillars 34 may incorporate devices for providing the controlled force. The controlled force provided by the central pillar 34 may be derived from an integral hydraulic or pneumatic piston, a linear actuator, a mechanical screw, or an electric motor. The cover housing 26, shown without the truck cover 24, is a protective shell with a spring-loaded roller 38 passing therethrough for supporting and winding the truck cover 24.

Figure 4:
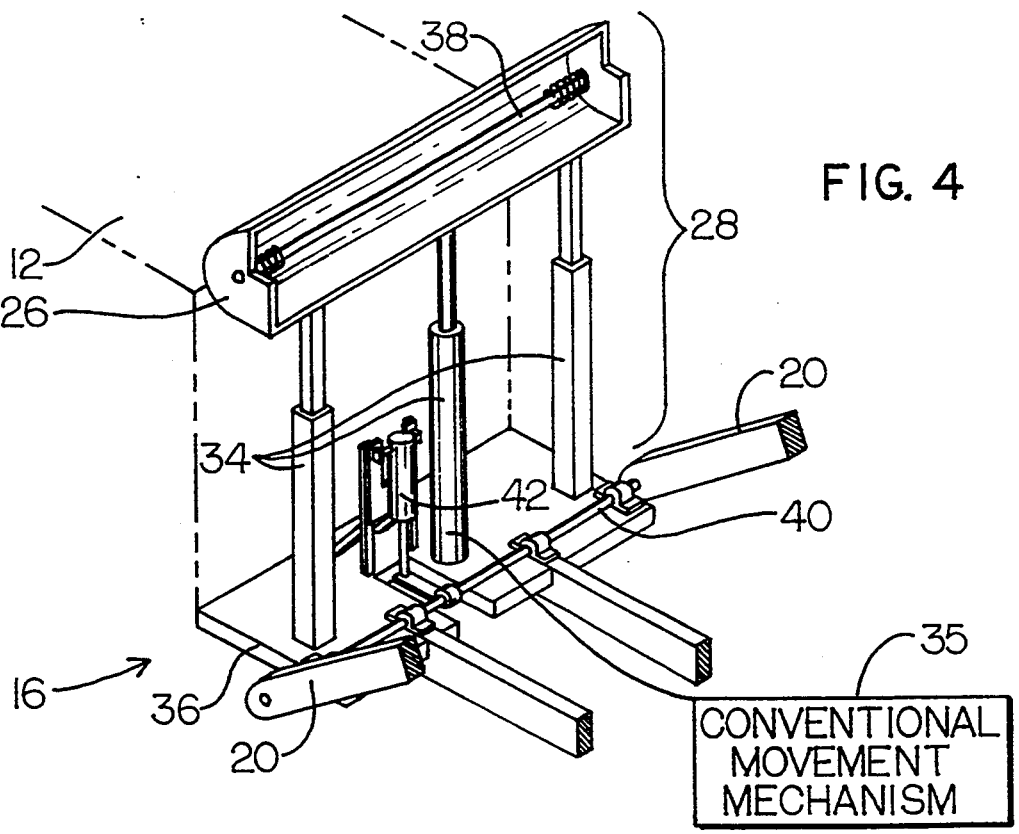
FIG. 4 is a perspective view of an alternative embodiment of the front mount telescopic arm assembly of FIG. 3.

The telescopic arms 20 move in two different senses: fore and aft; and extension and retraction. In order to permit fore and aft movement of the telescopic arms 20 along the sides of the body 14, each of the arms 20 is pivotally attached to the assembly support platform 36. Fore and aft actuation of the arms 20 may be via: hydraulic or pneumatic cylinders coupled directly to the arms 20 or acting through a linkage such as a bellcrank; hydraulic or electric motors; or cables and pulleys. In the embodiment of FIG. 3, pivotal articulation of the lower end of each arm 20 is furnished by a shaft 40 connected to the drive mechanism 32 which is anchored to the assembly support platform 36. When the drive mechanism 32 is activated, it turns the shaft 40 which causes the arms 20 to rotate with the shaft in unison. FIG. 4 is a depiction of an alternative embodiment of the assembly 16 of FIG. 3 which uses a linear actuator 42 as the drive mechanism 32. Movement of the arms 20 fore and aft requires that the arms 20 extend and retract in order to maintain a substantially stable height near the top of the container 14 while the truck cover 24 is being unfurled or stowed. As with the drive mechanism 32 which moves the arms 20 back and forth, there are many ways to cause the arms 20 to extend and retract, including: hydraulic and pneumatic cylinders; linear, hydraulic, or pneumatic linear actuators; lead screw(s); and cables and pulleys.

Figure 6:
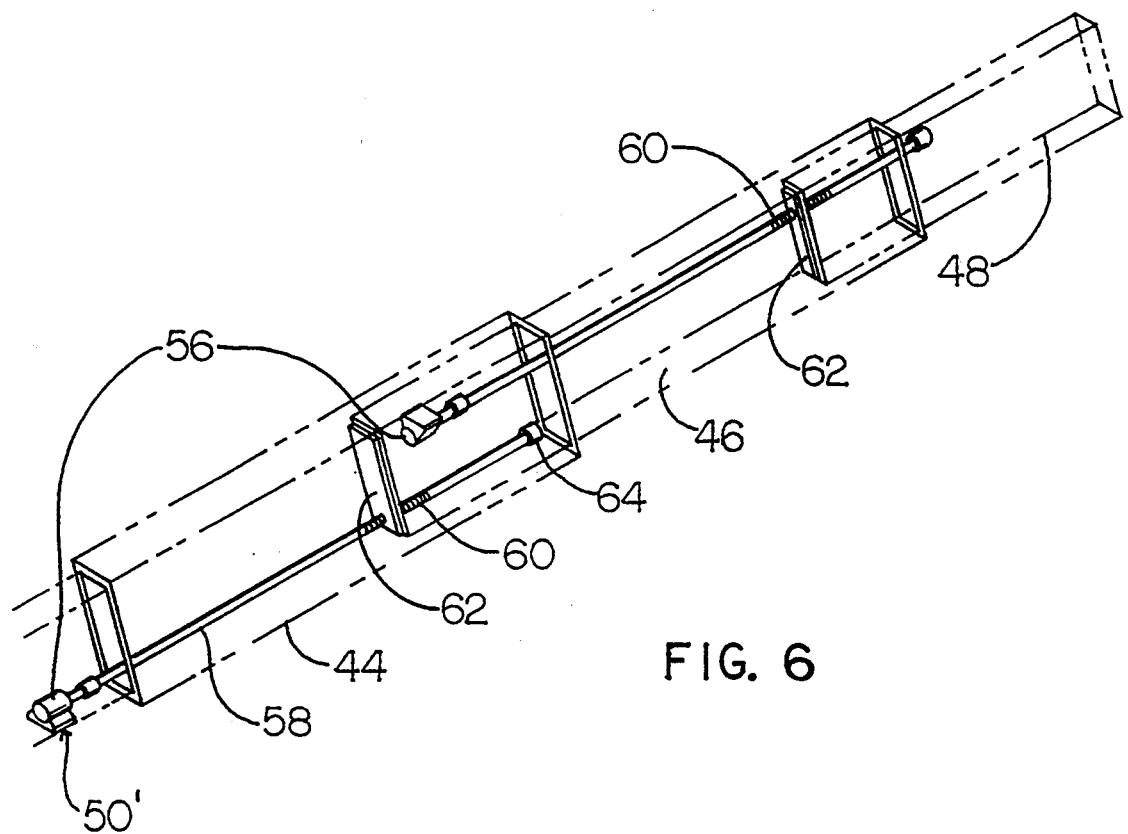
FIG. 6 is a perspective view of an alternative embodiment of the telescopic arm of FIG. 5.
Figure 5:
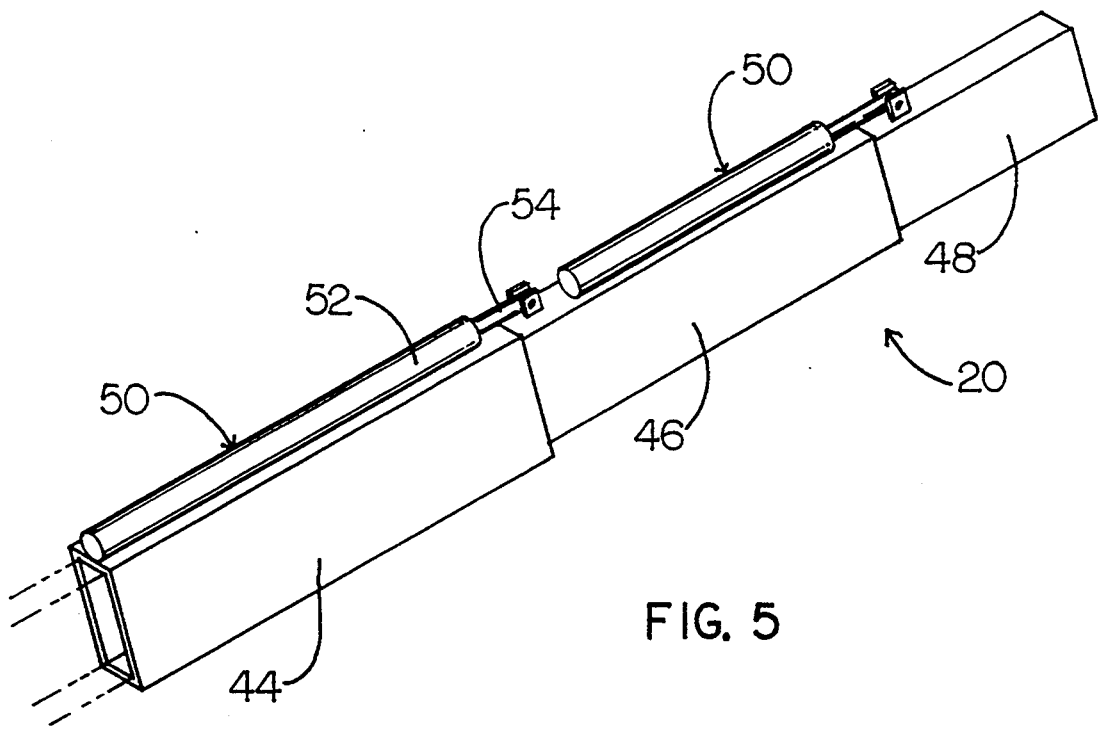
FIG. 5 is a perspective view of a single telescopic arm of the assembly of FIGS. 1 and 2.

FIGS. 5 and 6 depict two different embodiments of the arms 20 and the means for causing them to extend and retract compatible with the concept of the invention. In FIG. 5, a single telescopic arm 20 has lower, middle, and upper segments 44, 46, 48 respectively. Each of the hollow segments 44, 46, 48 has a size and shape allowing it to slidably mate with a portion of each adjacent segment. The uppermost segment 48 has the smallest circumference and nests within the middle segment 46, which in turn nests within the lower segment 44. The number and size of segments used to form each arm 20 is a function of the container depth and length, and the nesting of segments is adapted accordingly. Adjacent segments are connected by at least one externally mounted segment actuator 50. An outer cylinder or case 52 of the segment actuator 50 is attached to one segment and a piston or shaft 54 is attached an adjacent segment. As the piston 54 is activated in response to a control signal, the segments 44, 46, 48 move together and thereby collapse the arm 20, move apart and extend it, or are stabilized with respect to each other and thereby lock the arm 20 at a given length. Depending upon the control input, each of the segment actuators 50 may move the segments in unison or sequentially to extend or contract the arm 20 as desired.

Referring to FIG. 6, an alternative embodiment of a telescopic arm 20 is shown wherein a different embodiment of the segment actuators 50' are positioned inside the hollow arm 20 segments. In this embodiment a motor 56 attached to the interior of a segment turn a threaded shaft 58. The threads 60 of the threaded shaft 58 mate with a threaded block 62 located near the end of the adjacent segment. Rotation of the threaded shaft 58 causes the segments 44, 46, 48 to move together or apart depending upon the direction of rotation of the threaded shaft 58. When the threaded shaft 58 is not rotating, the segments 44, 46, 48 are locked into position. An optional safety stop 64 is provided at the end of each threaded shaft 58 to prevent an over-extension of the arm 20. The safety stop 64 impacts with the threaded block 62 of the nesting segment as it retracts a predetermined distance into the adjacent segment. Otherwise, operation of the arm 20 is substantially identical with the arm 20 of FIG. 5.

Figure 7:
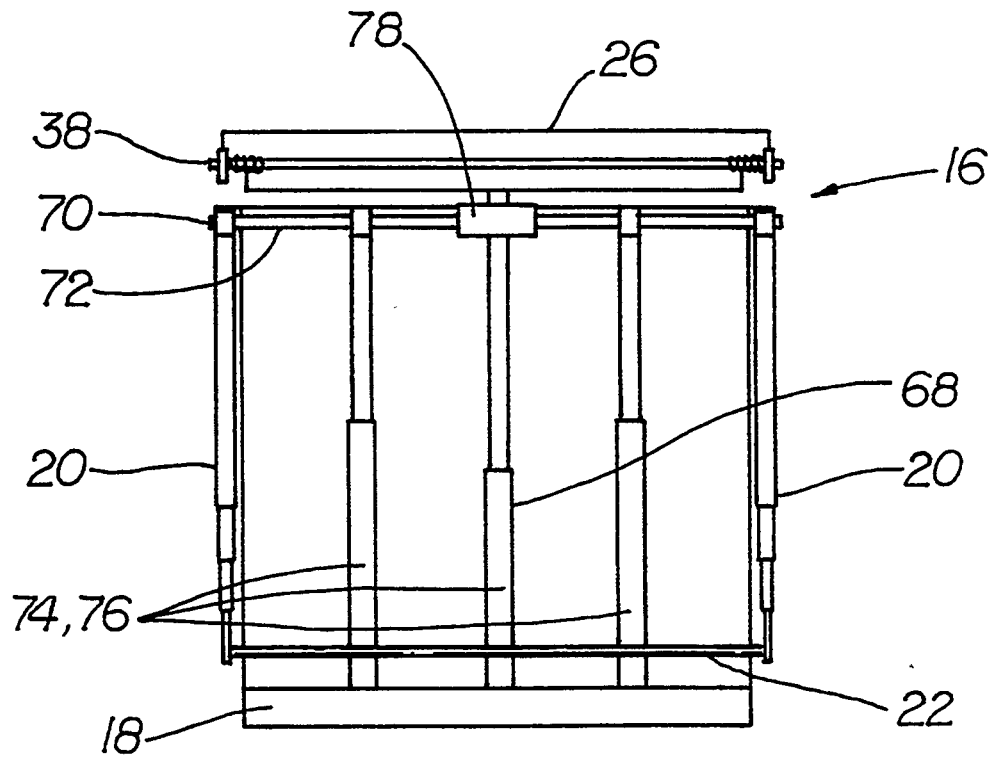
FIG. 7 is a rear elevational view of an alternative front mount telescopic arm assembly installed on a truck without a container body.

FIG. 7 illustrates another embodiment of the front mount telescopic arm assembly 16 positioned on the truck frame 18 forward of the position that is to be occupied by a container body 14 (not shown) in a manner similar to that shown with respect to FIG. 1. The assembly 16 is a compact, self-contained unit that is installed on or removed from a truck as a single module. The assembly is configured so as to enable a truck operator to comply with maximum trailer width laws and regulations, the telescopic arm assembly 16 being no wider at any point than a given legal maximum trailer width.

The assembly 16 includes a powered gantry 68 for raising and lowering the cover housing 26, a spring-loaded roller 38 or winding device, and flexible cover 24 (not shown) with respect to a base or support platform 36 (shown more clearly with respect to FIGS. 3 and 4). Although the base or support platform 36 is configurable in various manners to more effectively mate with a truck frame 18, for the purpose of description it is depicted in stylized form as a horizontal plate. The gantry 68 also supports telescopic arms 20 that are coupled to an axle 70 providing pivot points about which the telescopic arms 20 are caused to rotate. The axle 70 is positioned on the gantry 68 within an optional axle housing 72 subjacent the winding device. The axle 70 and axle housing 72 are positionable co-planar with the top of the container body 14, or slightly above or below it. The ends of the telescopic arms 20 are detachably secured to a tie-rod 22. The tie-rod 22 secures the free end of the cover (not shown) along its entire length, or at a plurality of attachment points, and helps to stabilize the telescopic arms 20 and ensure that they move in unison.

Movement of the gantry 68 is provided by a vertical movement actuator 74, such as an hydraulic or a pneumatic piston, a linear actuator, a mechanical screw, an electric motor, or other such device well know in the art, that is integral with or housed within any or all of the telescopic support columns 76. A rotation actuator 78, such as an electric, hydraulic, pneumatic motor, or other such device as is known in the art, is supported by the central support column 76 and coupled to the axle 70 in a manner so as to impart sufficient force to the axle 20 to move the telescopic arms 20 through a full range of motion.

Figure 8:
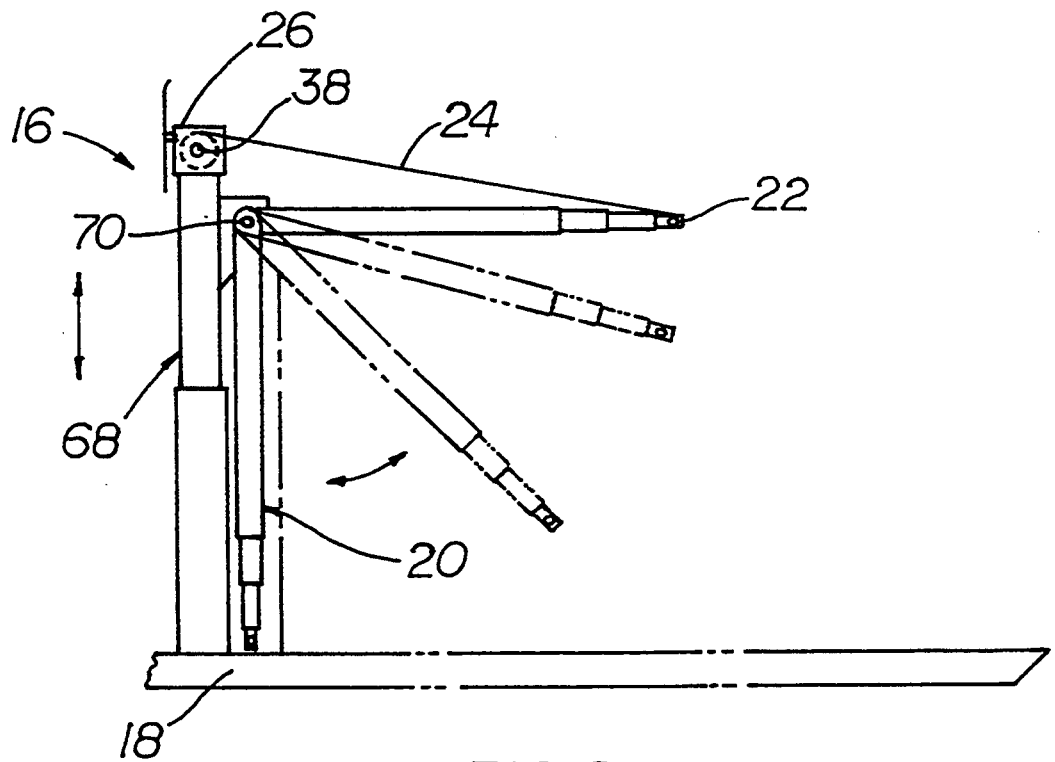
FIG. 8 is a side elevational view of the assembly of FIG. 7 illustrating rotation of the telescopic arms in preparation for on-loading of a container body.

Without a container body on the frame 18, the axle housing 72 is vertically positionable to allow the telescopic arms 20 to be pivoted downward to a vertical position, with respect to the base, in their fully retracted state. FIG. 8 depicts upward rotation of the telescopic arms 20 from a first position parallel to the movement axis of the gantry and orthogonal to the base, to a second position orthogonal to the movement axis and parallel to the base, in preparation for placement of a container body on the truck frame 18.

When an operator wishes to load a container body on to the truck frame 18, the telescopic arms 20 are rotated upward to a position that allows unimpeded access to the truck frame 18. The telescopic arms 20 can even be rotated upward to a vertical position, in addition to the horizontal position shown in FIG. 8, or any intermediate position by the rotation actuator 78.

While the cover 24 is only shown attached to the tie-rod 22 when the telescopic arms 20 are in the horizontal position, it is to be understood that it is also connected in the starting or downward position, or in other intermediate positions. The spring-loaded roller 38 maintains an even tension on the cover 24 as it is withdrawn or retracted during rotation of the telescopic arms 20. With the telescopic arms 20 in an out of the way position, a container body may be on-loaded.

Figure 9:
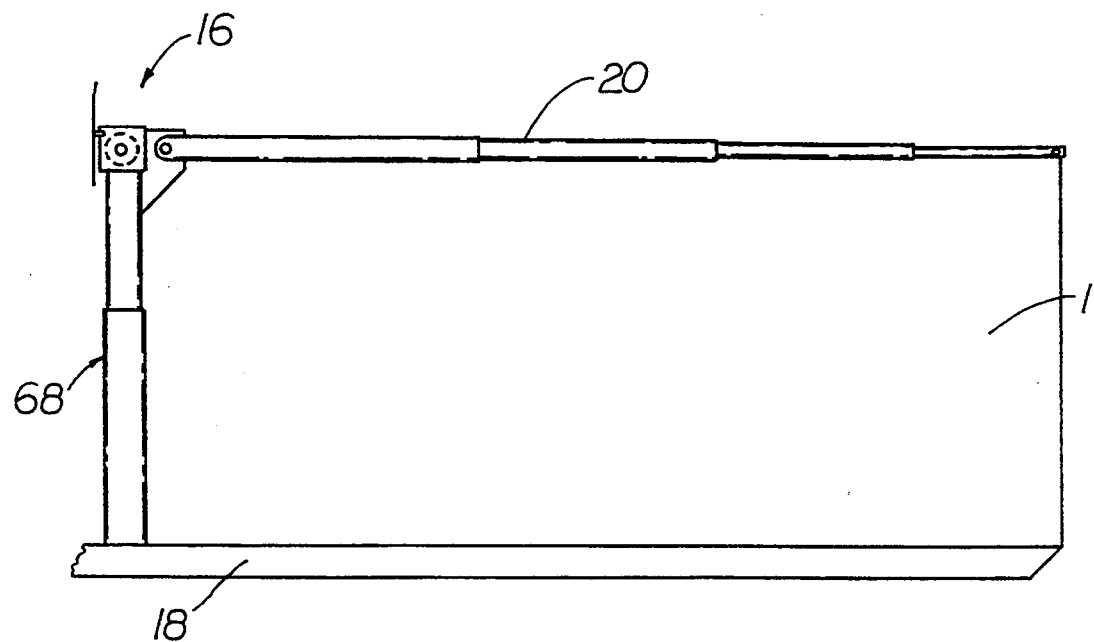
FIG. 9 is a side elevational view of a truck trailer having a container body thereon that depicts the telescopic arms and cover fully extended along the upper edge of the container body.

FIG. 9 depicts a container body 14 positioned on the truck frame 18. After aligning the axle 70 and the pivot points with the upper edge of the container, the telescopic arms 20 are lowered by the rotation actuator 78 to position them substantially parallel or co-planar to the upper edge of the container body 14. The telescopic arms 20 are then extended outwardly from the gantry 68 along the upper edge of the container, without passing outboard of the plane defined by each respective side of the container, thus drawing the cover 24 over the load. Mechanisms for extending or contracting the telescopic arms 20 in this manner include the actuators described with respect to FIGS. 5 and 6 or other mechanisms known in the art.

The vertical movement actuator 74 is also used to adjust the position of the gantry 68, such as by lowering it a sufficient amount to place the cover 24 in a horizontal position over the container body 14 before, during, or after extension of the telescopic arms 20. In an alternative embodiment, the telescopic arms 20 are sufficiently retractable to be used with an immovable support structure that positions the spring-loaded roller 38 in horizontal alignment with the top of the container body 14. In this embodiment, the spring-loaded roller 38 does not need to be moved vertically.

Figure 10:
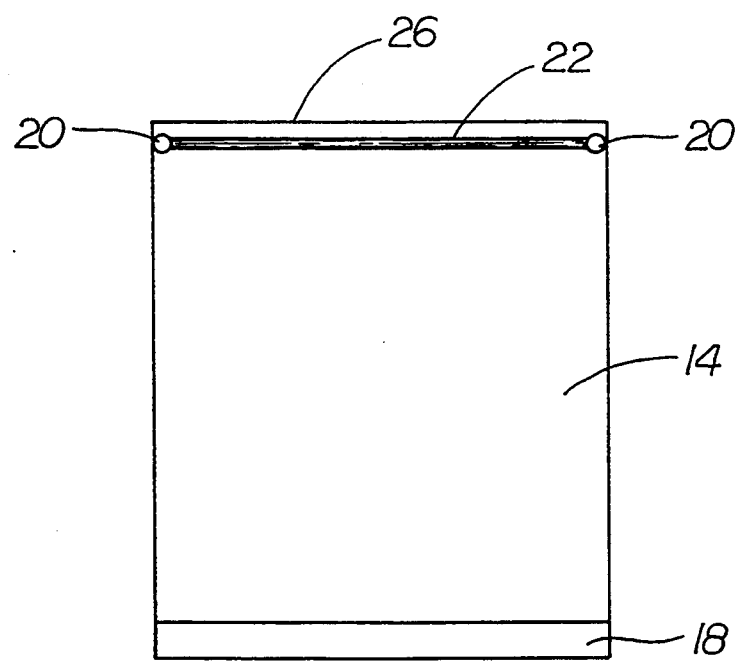
FIG. 10 is a rear elevational view of a truck and a trailer body showing a tie-rod that is attached to one end of the cover and that secures the ends of the telescopic arms to each other.

Once the container body 14 is placed on the truck frame 18, the telescopic arms 20 and the cover 24 attached thereto may be horizontally extended and retracted over the load at will. At no point during extension or retraction operations, or with the load fully protected by the cover 24, does the assembly 16 protrude beyond the sides of the container body 14. This is clearly illustrated in FIG. 10, wherein a rear view of a truck frame 18, having a container body 14 thereon, clearly shows the relationship of the telescopic arms 20 to the sides of the container body 14.

Numerous modifications and variations of the present invention are possible in light of the above teachings. It is, therefore, to be understood that within the scope of the appended claims, the present invention may be practiced otherwise than as in the embodiments specifically described hereinabove.

I claim:

1. A self-contained, compact cover assembly, including,
   a flexible cover having a first end and a second end;
   a winding device attached to said first end of said flexible cover facilitating smooth extraction and retraction of said cover from said winding device;
   a gantry having a base for securing said gantry to a truck frame, said gantry supporting said winding device and including,
   a first and a second pivot point subjacent said winding device, and
   at least one telescopic support column adapted to raise and lower said winding device along a plane orthogonal to said base;
   a first and a second telescopic arm each having a first end and a second end, each said second end attached to said second end of said flexible cover, said first and second telescopic arms pivotally attached at said first end to said first and second pivot points, respectively; and
   a rotation actuator movable in a first and a second direction and coupled to said first and second telescopic arms, said rotation actuator moving said first and second telescopic arms from a first position parallel to said plane to a second position orthogonal to said plane, said first and said second telescopic arms in said second position extendable in unison to deploy said flexible cover and contractible in unison to retract said flexible cover attached thereto.

2. The cover assembly of claim 1, further including a tie-rod joining said second end of each said telescopic arm, said tie-rod secured to said second end of said flexible cover.

3. The cover assembly of claim 1, wherein said at least one telescopic support column comprises a plurality of telescopic support columns.

4. The cover assembly of claim 2, wherein one of said plurality of telescopic support columns includes said vertical movement actuator.

5. The cover assembly of claim 1, wherein said first and said second pivot points are located at a distance from said base sufficient to permit said first and said second telescopic arms in a fully retracted state to hang downward from said first and said second pivot points, respectively, so as to be orthogonal to said base.

6. A truck having a self-contained, compact cover assembly, comprising:
   a truck cab;
   a frame positioned behind said truck cab, said frame adapted to receive a load;
   a container having front, rear, first side, and second side container walls each having an upper edge, said container positioned on said frame behind said truck cab; and
   a compact cover assembly, including,
   a flexible cover having a first end and a second end;
   a winding device attached to said first end of said flexible cover facilitating smooth extraction and retraction of said cover from said winding device;
   a gantry having a base secured to said frame, said gantry supporting said winding device and including,
   a first and a second pivot point subjacent said winding device, and
   at least one telescopic support column adapted to raise and lower said winding device along a plane orthogonal to said base;
   a first and a second telescopic arm each having a first end and a second end, each said second end attached to said second end of said flexible cover, each said first and second telescopic arm pivotally attached at said first end to said first and said second pivot points, respectively; and
   a rotation actuator movable in a first and a second direction and coupled to said first and second telescopic arms, said rotation actuator moving said first and second telescopic arms from a first position parallel to said plane to a second position orthogonal to said plane, said first and said second telescopic arms in said second position extendable in unison to deploy said flexible cover and contractible in unison to retract said flexible cover attached thereto.

7. The cover assembly of claim 6, wherein said first and second pivot points are positionable substantially co-planar with an upper container plane defined by said upper edge of said front, rear, first side, and second side container walls.

8. The cover assembly of claim 6, wherein said first and said second pivot points are positioned to longitudinally align said first and said second telescopic arms with said first and said second sides, respectively, of said container.

9. The cover assembly of claim 6, further including an axle coupled to said first and said second telescopic arms and to said rotation actuator, said axle transmitting force from said rotation actuator to said first and said second telescopic arms.

10. The cover assembly of claim 6, wherein said first and said second pivot points are located at a distance from said base sufficient to permit said first and said second telescopic arms in a fully retracted state to hang downward from said first and said second pivot points, respectively, so as to be orthogonal to said base.

11. A self-contained, compact cover assembly, including,
- a flexible cover having a first end and a second end;
- a winding device attached to said first end of said flexible cover facilitating smooth extraction and retraction of said cover from said winding device;
- a gantry having a base for securing said gantry to a truck frame, said gantry supporting said winding device and including,
- a first and a second pivot point subjacent said winding device and positioned at a distance from said base sufficient to permit said first and said second telescopic arms in a fully retracted state to hang downward from said first and said second pivot points, respectively, so as to be orthogonal to said base, and
- a plurality of telescopic support columns, at least one of which adapted to raise and lower said winding device along a plane orthogonal to said base;
- a first and a second telescopic arm each having a first end and a second end, each said second end attached to said second end of said flexible cover, each said first and said second telescopic arms pivotally attached at said first end to said first and said second pivot points, respectively;
- an axle positioned orthogonally to said plurality of telescopic support columns and supported thereby, said axle coupled to said first and said second telescopic arms at said first and said second pivot points, respectively; and
- a rotation actuator movable in a first and a second direction and coupled to said axle,
- wherein rotation of said rotation actuator in said first direction moves said first and second telescopic arms from a first position parallel to said plane to a second position orthogonal to said plane, said first and said second telescopic arms in said second position extendable in unison to deploy said flexible cover and contractible in unison to retract said flexible cover attached thereto.

12. The cover assembly of claim 11, further including a tie-rod joining said second end of each said telescopic arm, said tie-rod secured to said second end of said flexible cover thereto.

* * * * *

UNITED STATES PATENT AND TRADEMARK OFFICE
CERTIFICATE OF CORRECTION

PATENT NO. : 5,340,187
DATED : August 23, 1994
INVENTOR(S) : Edward N. Haddad, Jr.

It is certified that error appears in the above-indentified patent and that said Letters Patent is hereby corrected as shown below:

In the Abstract, line 1, "trick" should read --truck--.

Column 1, line 7, "07/911,030" should read --07/931,030--.

Column 3, line 53, "contact-" should read --contact.--.

Signed and Sealed this

Twenty-first Day of March, 1995

Attest:

BRUCE LEHMAN

*Attesting Officer*     *Commissioner of Patents and Trademarks*